United States Patent
Ishikawa et al.

(10) Patent No.: US 10,075,543 B2
(45) Date of Patent: Sep. 11, 2018

(54) CONTROL DISPLAY OF INFORMATION ACQUIRED FROM SOCIAL NETWORKING SERVICE ON ELECTRONIC BOOK CONTENT

(71) Applicant: SONY CORPORATION, Tokyo (JP)

(72) Inventors: Tsuyoshi Ishikawa, Kanagawa (JP);
Takuya Namae, Kanagawa (JP);
Daisuke Matsumoto, Kanagawa (JP);
Kenji Hisanaga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 497 days.

(21) Appl. No.: 14/333,768

(22) Filed: Jul. 17, 2014

(65) Prior Publication Data
US 2015/0039720 A1    Feb. 5, 2015

(30) Foreign Application Priority Data
Jul. 31, 2013   (JP) ................. 2013-158812

(51) Int. Cl.
| | | |
|---|---|---|
| *G06F 13/00* | (2006.01) | |
| *H04L 29/08* | (2006.01) | |
| *H04L 29/06* | (2006.01) | |

(52) U.S. Cl.
CPC .............. *H04L 67/22* (2013.01); *H04L 63/08* (2013.01)

(58) Field of Classification Search
CPC .............. G06Q 30/02; G06Q 30/0641; G06Q 30/0633; G06Q 30/0631; G06Q 30/0601; H04L 29/06; H04L 29/0809; H04L 29/08072; H04L 29/08981; H04L 63/08; H04L 67/22
USPC .......................................... 705/26.7; 709/217
See application file for complete search history.

(56) References Cited

U.S. PATENT DOCUMENTS

| | | | | |
|---|---|---|---|---|
| 8,478,662 | B1 * | 7/2013 | Snodgrass | G06Q 30/02 705/26.1 |
| 2012/0047455 | A1 * | 2/2012 | Yuan | G06F 15/0291 715/781 |
| 2012/0260163 | A1 * | 10/2012 | Kim | G06F 3/0483 715/273 |
| 2014/0068428 | A1 * | 3/2014 | Puppin | G06F 17/30575 715/273 |
| 2014/0089775 | A1 * | 3/2014 | Worsley | G06F 17/30575 715/230 |

FOREIGN PATENT DOCUMENTS

JP    2011-108118 A    6/2011

* cited by examiner

*Primary Examiner* — Robert B Harrell
(74) *Attorney, Agent, or Firm* — Chip Law Group

(57) ABSTRACT

There is provided an information processing device including an information acquisition unit configured to, on the basis of a condition previously associated with at least a piece of identification information in book data in which the identification information is associated with at least a part of first information among pieces of information, acquire second information consistent with the condition from a social networking service, and an editing unit configured to replace the first information associated with the piece of identification information with the acquired second information.

12 Claims, 8 Drawing Sheets

FIG. 4 d60

| IDENTIFICATION INFORMATION (d612) | DEFAULT VALUE (d614) | TYPE (d616) |
|---|---|---|
| ID001 | Tom | Name of User |
| ID002 | Michel | Friend who Often Communicates with User |
| ID003 | AAA library | Library Near House of User |
| ID004 | BBB station | Station Near Office of User |
| ID005 | CCC city | Current Place of User |
| ... | ... | ... |

FIG. 6

| IDENTIFICATION INFORMATION | DEFAULT VALUE | TYPE | REPLACEMENT INFORMATION |
|---|---|---|---|
| ID001 | Tom | Name of User | Jiro |
| ID002 | Michel | Friend who Often Communicates with User | Shinji |
| ID003 | AAA library | Library Near House of User | - |
| ID004 | BBB station | Station Near Office of User | FFF station |
| ID005 | CCC city | Current Place of User | GGG Town |
| ... | ... | ... | ... | d812  d814  d816  d818  d80

CONTROL DISPLAY OF INFORMATION ACQUIRED FROM SOCIAL NETWORKING SERVICE ON ELECTRONIC BOOK CONTENT

CROSS REFERENCE TO RELATED APPLICATIONS

This application claims the benefit of Japanese Priority Patent Application JP 2013-158812 filed Jul. 31, 2013, the entire contents of which are incorporated herein by reference.

BACKGROUND

The present disclosure relates to an information processing device, an information processing method, and a program.

Instead of usual printed books, there is a technology for causing contents of the printed books to be read as electronic book content (electronic data) on a user terminal such as a smartphone by distributing the contents of the books to the user terminal.

In addition, a social networking service (SNS) has become popular recently, the SNS being able to build a social network on the Internet. With a popularization of the SNS, opportunities for new communication have been provided on a network, and it has become possible for a user to build a new social network (in other words, connection between users) (for example, see JP 2011-108118A).

SUMMARY

On the other hand, by providing contents of books as electronic book content, not only a technology for merely causing contents of books to be read like usual printed books but also a technology for providing additional value which is difficult to get when provided by printed media has been sought after.

Accordingly, the present disclosure proposes a novel and improved information processing device, information processing method, and program that can reflect information acquired from the social networking service on at least a part of the electronic book content.

According to an embodiment of the present disclosure, there is provided an information processing device including an information acquisition unit configured to, on the basis of a condition previously associated with at least a piece of identification information in book data in which the identification information is associated with at least a part of first information among pieces of information, acquire second information consistent with the condition from a social networking service, and an editing unit configured to replace the first information associated with the piece of identification information with the acquired second information.

According to an embodiment of the present disclosure, there is provided an information processing method including acquiring, on the basis of a condition previously associated with at least a piece of identification information in book data in which the identification information is associated with at least a part of first information among pieces of information, second information consistent with the condition from a social networking service, and replacing, by a processor, the first information associated with the piece of identification information with the acquired second information.

According to an embodiment of the present disclosure, there is provided a program for causing a computer to execute acquiring, on the basis of a condition previously associated with at least a piece of identification information in book data in which the identification information is associated with at least a part of first information among pieces of information, second information consistent with the condition from a social networking service, and replacing the first information associated with the piece of identification information with the acquired second information.

According to one or more of embodiments of the present disclosure, the present disclosure proposes the information processing device, information processing method, and program that can reflect information acquired from the social networking service on at least a part of the electronic book content Note that the present disclosure is not limited to the effect stated above and in addition to or in place of the effect stated above, may achieve any of the effects indicated in this specification or effects that can be understood from the specification.

BRIEF DESCRIPTION OF THE DRAWINGS

FIG. 4 is a diagram showing an example of replacement control information;

FIG. 6 is a diagram showing an example of a replacement-information management table;

DETAILED DESCRIPTION OF THE EMBODIMENT(S)

Figure 1:
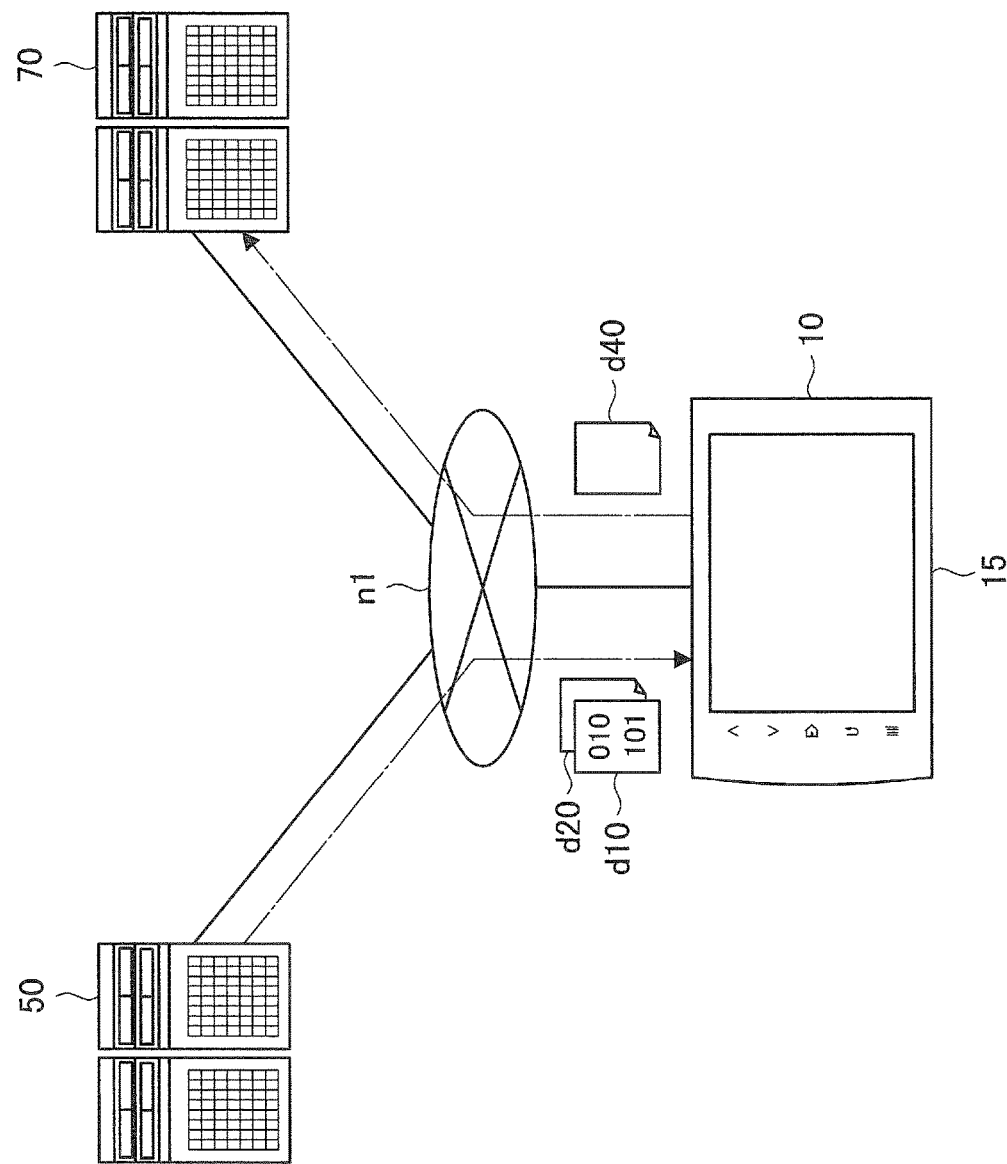
FIG. 1 is a diagram showing a schematic system configuration of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Overview
2. Configuration of Information Processing device
3. Processing
4. Hardware Configuration Example
5. Conclusion

1. Overview

First, with reference to FIG. 1, a schematic system configuration of an information processing system 1 including an information processing device 10 according to an embodiment of the present disclosure will be described. FIG. 1 is a diagram showing the schematic system configuration of the information processing system 1 according to the present embodiment. As shown in FIG. 1, the information processing system 1 according to the present embodiment includes an information processing device 10, a content distribution server 50, and an external server 70.

The information processing device 10, the content distribution server 50, and the external server 70 are capable of transmitting and receiving information between each other via a network n1. For example, the network n1 is constructed of the Internet, dedicated lines, a local area network (LAN), or a wide area network (WAN). As long as the network n1 which can connect between different devices is used, there are no limitations on the specification of the network n1.

The content distribution server 50 is a server for distributing electronic book content (hereinafter sometimes referred to as "electronic book content d20") and an application d10 used to read the electronic book content d20 to the information processing device 10. As a specific example of the content distribution server 50, a server that provides services of an online store or the like for selling the electronic book content d20 and/or the application d10 via a network such as the Internet can be given. Note that, the electronic book content d20 corresponds to an example of "book data".

The information processing device 10 according to the present embodiment acquires the electronic book content d20 from the content distribution server 50 and displays the acquired electronic book content d20 in a readable manner via a display unit 15 such as a display. For example, the information processing device 10 may be a smartphone, a tablet, or an electronic book terminal.

For example, the information processing device 10 accesses the content distribution server 50 via the network n1, and downloads and internally installs the application d10. By doing so, it is possible to add a function for reading the electronic book content d20 to the information processing device 10.

The information processing device 10 then downloads the electronic book content d20 from the content distribution server 50. By running the installed application d10, the information processing device 10 displays an article (content) included in the downloaded electronic book content d20 in a readable manner on the display unit 15.

In addition, the information processing device 10 according to the present embodiment can replace some information in the electronic book content d20 with information about a user who is a reader. As a specific example, it is possible for the information processing device 10 to replace some characters in a story provided as the electronic book content d20 with the user or people related to the user, or to replace some locations of scenes in the story with some locations related to the user.

Moreover, the information processing device 10 acquires, from the social networking service (SNS), at least some information used for replacement of information in the electronic book content d20.

The external server 70 represents a server for providing the SNS via the network n1.

For example, the information processing device 10 may acquire desired information from a profile of the user registered in the SNS or text and images which the user uploaded on the SNS in the past.

The information acquired from the SNS is not limited to information about the user (that is, reader of the electronic book content d20) of the information processing device 10. For example, the information acquired from the SNS includes other information which can be acquired on the basis of association between users in the SNS (for example, a social graph). As a specific example, with regard to a user ID of a user (for example, the user of the information processing device 10), the information processing device 10 may acquire, from the SNS, user information (that is, information about one of friends of the user) corresponding to another user ID associated as one of the friends on the SNS. As another example, the information processing device 10 may acquire, from the SNS, information (position information) about places associated with the user ID of the user on the SNS.

Figure 2:
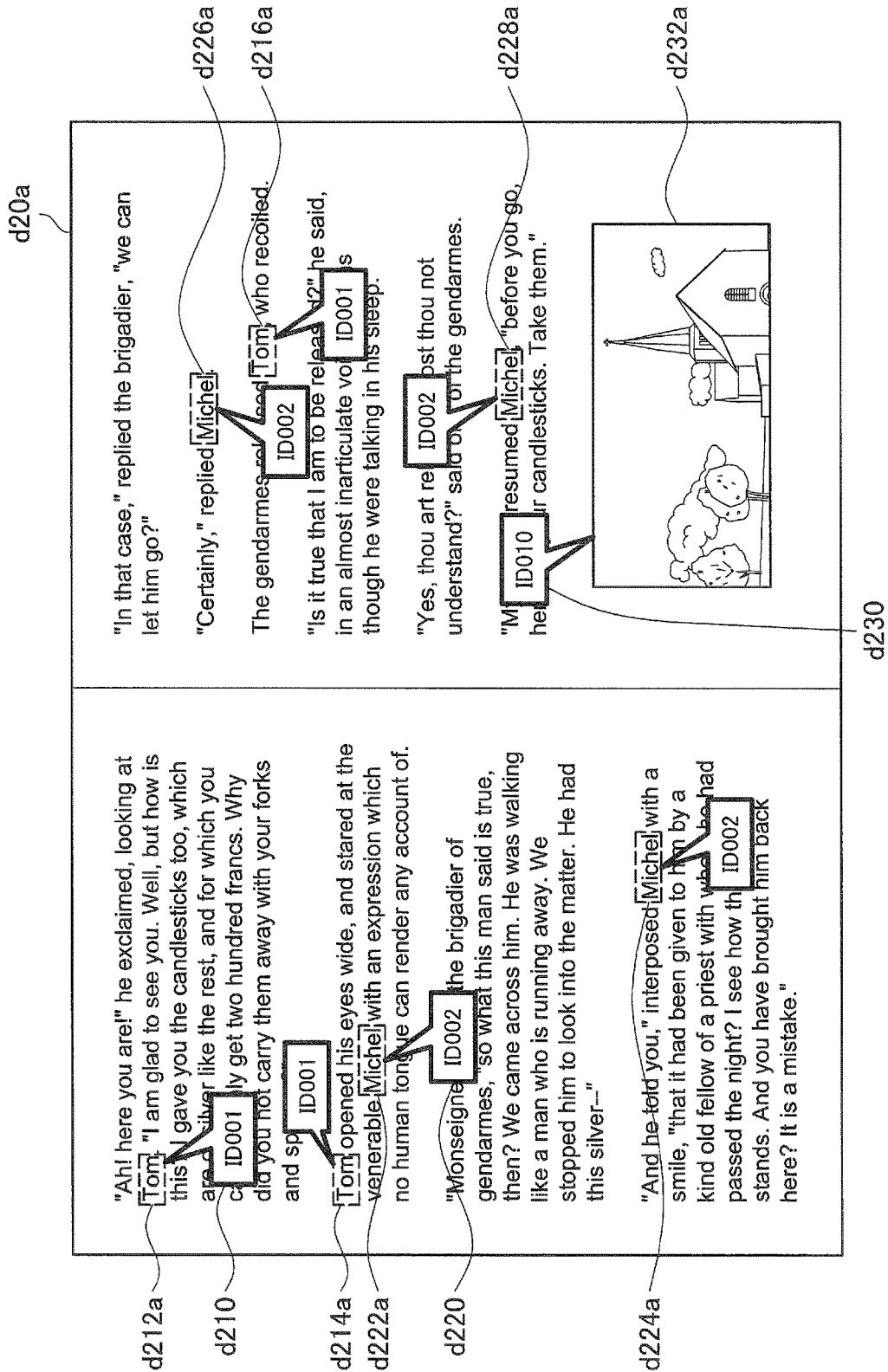
FIG. 2 is an explanatory diagram of an example application of an information processing device according to the embodiment.
Figure 3:
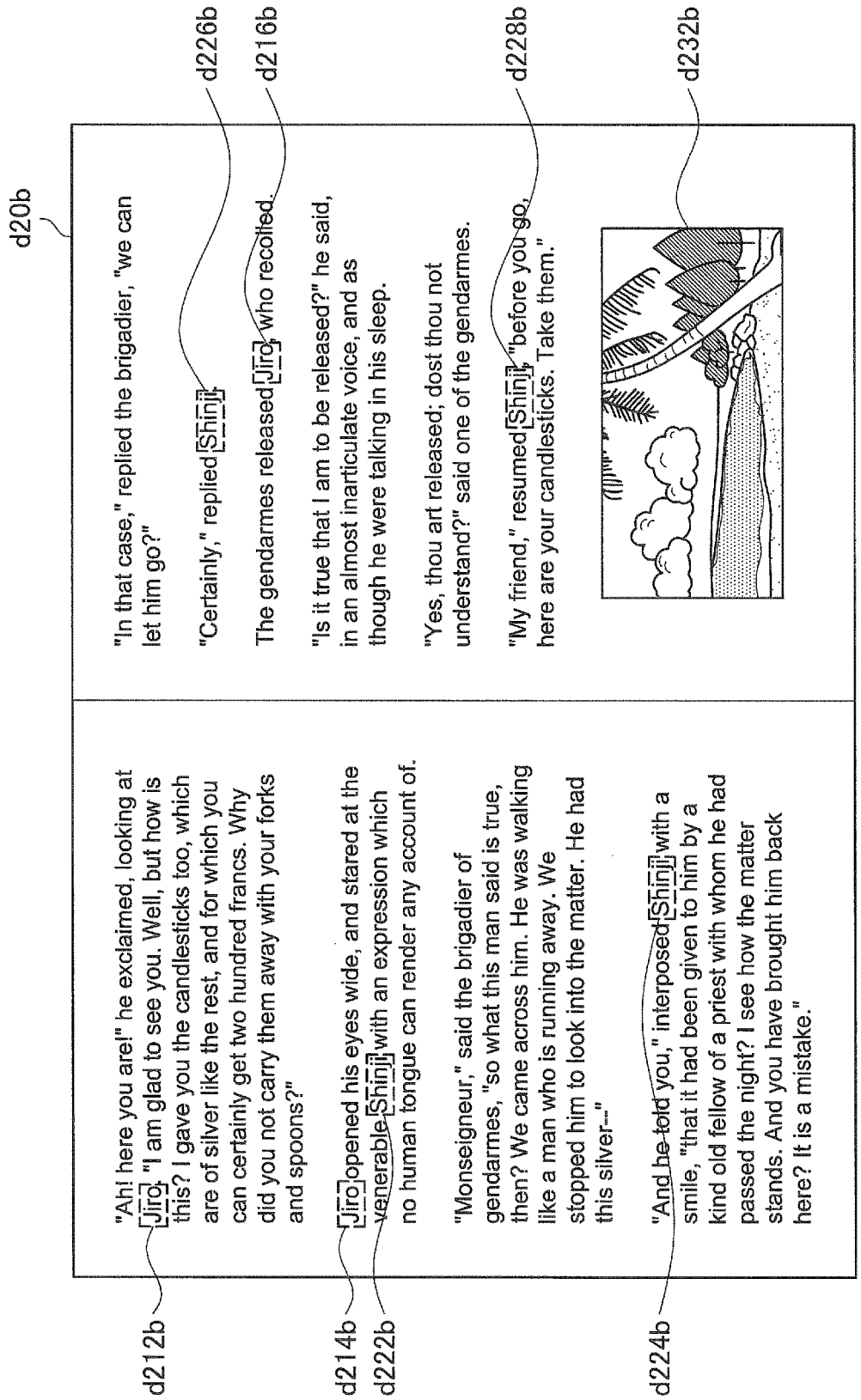
FIG. 3 is an explanatory diagram of an example application of the information processing device according to the embodiment.

Referring to FIGS. 2 and 3 and a following specific example application, there is described an operation that the information processing device 10 according to the present embodiment replaces some information in the electronic book content d20 with information about the user (reader). FIGS. 2 and 3 are explanatory diagrams of an example application of the information processing device 10 according to the present embodiment.

First, refer to FIG. 2. FIG. 2 shows an example of the electronic book content d20 acquired from the content distribution server 50, that is, the electronic book content d20 before some information is replaced by the information processing device 10. Hereinafter, the electronic book content d20 before some information is replaced by the information processing device 10 may be explicitly referred to as "electronic book content d20a".

As shown in FIG. 2, some information included in the electronic book content d20 is associated with identification information for identifying each of the some information. As shown in FIG. 2, as a specific example, textual information d212a indicating "Tom" that is a name of a hero is associated with identification information d210 represented by "ID001". In a similar way, textual information d222a indicating "Michel" that is a name of one of friends of the hero is associated with identification information d220 represented by "ID0002". In addition, an illustration suggesting a location of a scene in a story, that is, image information d232a is associated with identification information d230 represented by "ID010".

Next, refer to FIG. 3. FIG. 3 shows an example of the electronic book content d20 after the information associated with the identification information d210, d220, and d230 in the electronic book content d20a shown in FIG. 2 are replaced with other information by the information processing device 10. Hereinafter, the electronic book content d20 after some information is replaced by the information processing device 10 may be explicitly referred to as "electronic book content d20b".

In the example shown in FIG. 3, the information processing device 10 replaces the textual information d212a associated with the identification information d210 represented by "ID001" with textual information d212b indicating "Jiro" that is a name of the user (reader). In a similar way, the information processing device 10 replaces the textual information d222a associated with the identification information d220 represented by "ID002" with textual information d222b indicating "Shinji" that is a name of one of friends of the user. In addition, the information processing device 10 replaces the image information d232a associated with the identification information d230 represented by "ID010" with image information d232b taken by the user in the past.

As described above, each piece of the identification information is associated with a previously-decided condition, and the information processing device 10 replaces information associated with each piece of the identification information with information acquired on the basis of the condition associated with the piece of identification information. Specifically, the electronic book content d20 is associated with replacement control information d60 for replacing information associated with identification information, and the information processing device 10 replaces information in the electronic book content d20 on the basis of the replacement control information d60. For example, FIG. 4 shows an example of the replacement control information d60.

As shown in FIG. 4, the replacement control information d60 includes pieces of identification information d612, default values d614, and types d616. The identification information d612 indicates identification information (for example, the pieces of identification information d210, d220, and d230) associated with information in the electronic book content d20. The default value d614 indicates information (that is, textual information or image information) associated with the identification information d612 in the electronic book content d20a before replacing the information. The type d616 indicates a type of other information to be replaced with the information indicated by the default value d614. For example, the type d616 indicates semantic contents of the other information or a condition for acquiring the other information.

For example, the identification information d612 indicated by "ID0001" is associated with "Tom" as the default value d614, and "Name of User" is indicated in the type d616. In this case, the information processing device 10 acquires information about a name of the user from a profile of the user registered in the SNS, and replaces the textual information "Tom" associated with "ID001" with the acquired name, for example. In the example shown in FIG. 3, the information processing device 10 replaces the textual information "Tom" with textual information "Jiro" indicating the acquired name of the user.

Moreover, the identification information d612 indicated by "ID0002" is associated with "Michel" as the default value d614, and "Friend who Often Communicates with User" is indicated in the type d616. In this case, the information processing device 10 may access the SNS, search the social graph, and acquire a name of another user (for example, another user having a huge amount of traffic and comments on massages from the user, for example) who often communicates with the user among the other users associated with the user, for example. After acquiring the name of the another user based on the search of the social graph, the information processing device 10 replaces the textual information "Michel" associated with "ID002" with the acquired name. In the example shown in FIG. 3, the information processing device 10 replaces the textual information "Michel" with textual information "Shinji" indicating the acquired name of the another user.

In a case where information consistent with a condition indicated by the type d616 was failed to be acquired, the information processing device 10 does not have to replace information associated with appropriate identification information d612. In this case, information indicated by the default value d614 is displayed as the information associated with the appropriate identification information d612 in the electronic book content d20.

By the above-described configuration, the information processing device 10 according to the present embodiment can replace at least some information in the electronic book content d20 with pieces of information which the user as a reader forms by using the SNS. Accordingly, the user can enjoy the electronic book content d20 as a work having more sense of affinity and reality.

In addition, the information processing device 10 according to the present embodiment acquires information about the user as the reader from the SNS. Accordingly, the information processing device 10 can acquire not only information about the user himself/herself but also other information (for example, information about other users) associated with the user from the social graph, and it is possible to reflect the acquired information on the electronic book content d20. That is, the information processing device 10 according to the present embodiment can reflect, on the electronic book content d20, not only information about the user as the reader, but also information based on a social network built between the user and other users in the SNS. Accordingly, the user can enjoy the electronic book content d20 as the work having more sense of affinity and reality than a case where information only about the user himself/herself is reflected on.

Note that although an example where the application d10 and the electronic book content d20 are provided as separate data has been described above, it is also possible to use a configuration where the application d10 is embedded inside the electronic book content d20. It is preferable that a function to replace some information in the electronic book content d20 is provided together with a function to read the electronic book content d20 by using the application d10.

In addition, a way of provision of the application d10 and the electronic book content d20 is not limited to the distribution from the content distribution server 50. As a specific example, the application d10 may be previously installed in the information processing device 10, and the electronic book content d20 may be previously stored in the information processing device 10 (that is, the application d10 and/or the electronic book content d20 may be pre-installed). The application d10 and/or the electronic book content d20 may also be provided by using, as a medium, a secondary storage apparatus, such as an optical disk or an SD memory card, that is capable of nonvolatile storage of data.

2. Configuration of Information Processing Device

Figure 5:
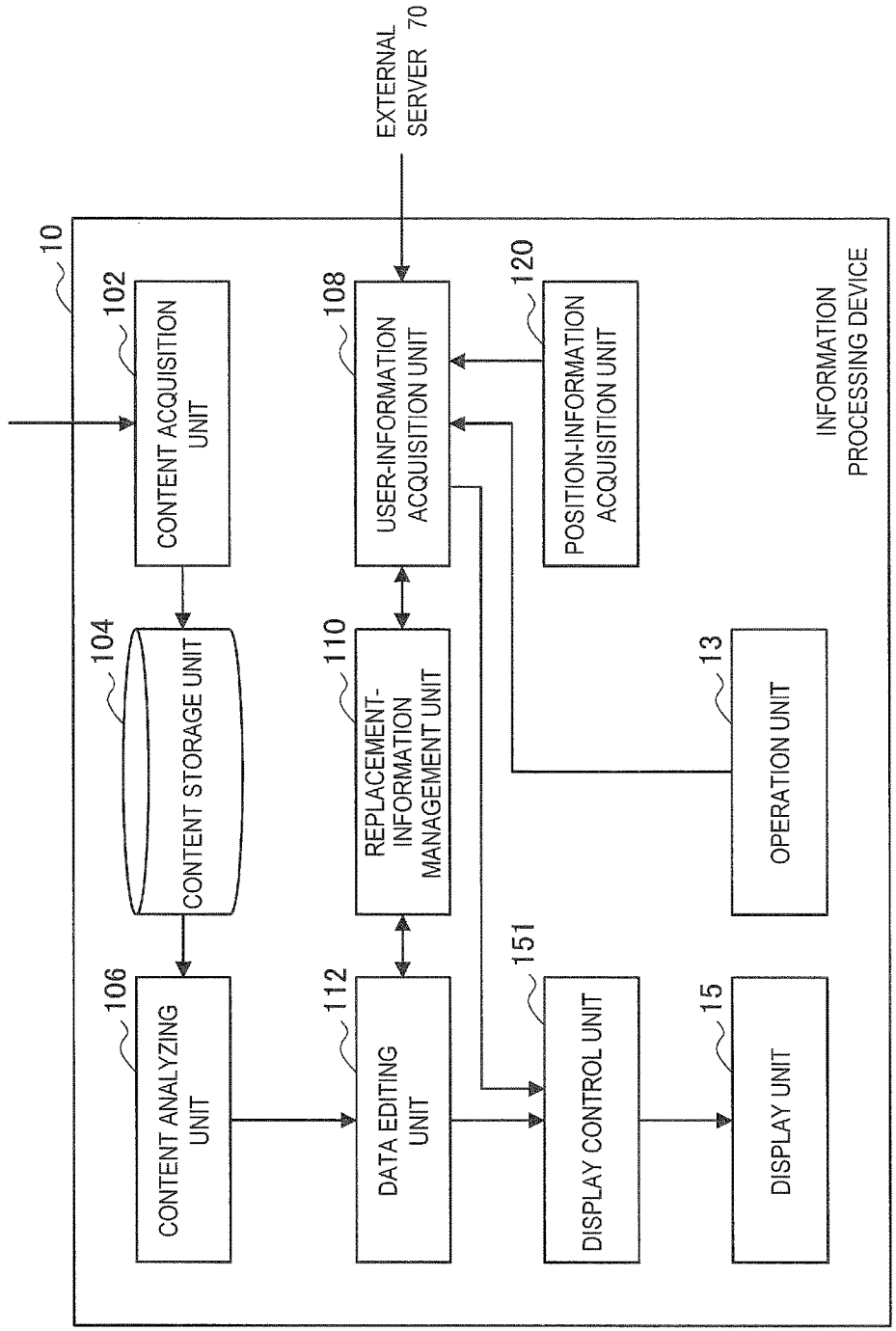
FIG. 5 is a block diagram showing a configuration of the information processing device according to the embodiment.

Next, with reference to FIG. 5, the configuration of the information processing device 10 according to the present embodiment will be described. FIG. 5 is a block diagram showing the configuration of the information processing device 10 according to the present embodiment. As shown in FIG. 5, the information processing device 10 includes a content acquisition unit 102, a content storage unit 104, a content analyzing unit 106, a user-information acquisition unit 108, a position-information acquisition unit 120, a replacement-information management unit 110, a data editing unit 112, an operation unit 13, and a display unit 15.

Note that when describing the various parts of the configuration of the information processing device 10 according to the present embodiment hereinafter, first the configuration of the electronic book content d20 according to the present embodiment will be described and then the various parts of the configuration of the information processing device 10 will be described. In addition, the configuration of the information processing device 10 will be described split into "user-information acquisition processing" for acquiring information about the user as a reader, and "information replacement processing" for replacing some information in the electronic book content d20 with information about the user, focusing on the parts of the configuration that operate in each of such cases.

(Configuration of Electronic Book Content)

In the electronic book content d20 according to the present embodiment, some information among pieces of information to be displayed (that is, information to be read by the reader) can be selectively replaced. Hereinafter, replaceable information in the electronic book content d20 may be referred to as "target information". The target information corresponds to an example of "first information".

The electronic book content d20 according to the present embodiment may be provided in any one of a fixed layout type format and a reflow layout type format. Such fixed layout type is a format where information (textual information and image information) included in the electronic book content d20 is displayed as a page having been arranged based on rules (a layout) decided in advance regardless of a device in use and setting of a character size. On the other hand, such reflow layout type is a format where a layout is adjusted on the basis of the device in use and setting of the character size, and where the information included in the electronic book content d20 is displayed as a page.

In a case where the electronic book content d20 is provided in a format of the reflow layout type, it is preferable that a position of target information included in the electronic book content d20 is specified as a position in a sentence provided as the electronic book content d20. As a specific example, positions of pieces of target information may be specified by information indicating positions in sentences such as paragraph numbers, row numbers, and a character count of sentences provided as the electronic book content d20. Note that, the above description is merely an example. As long as a position of target information can be specified as a position in sentences provided as the electronic book content d20, the way of specifying is not limited.

In a case where the electronic book content d20 is provided in a format of the fixed layout type, positions of target information included in the electronic book content d20 may also be specified in a similar way as the case of the reflow layout type. Since page layout is fixed in a format of the fixed layout type, it may be possible that positions of pieces of information included in the electronic book content d20 are specified as positions (coordinates) in pages. Accordingly, in the case where the electronic book content d20 is provided in a format of the fixed layout type, positions of target information included in the electronic book content d20 may be specified as page numbers and positions in pages with the page numbers.

As described above with reference to FIGS. 2 and 3, pieces of target information are respectively associated with pieces of identification information for identifying respective pieces of the target information. It is preferable that the pieces of target information are respectively associated with pieces of identification information according to a semantic content indicated by the target information. In the example shown in FIG. 2, the name "Tom" of the hero is associated with the identification information "ID001", and the name "Michel" of one of the friends of the hero is associated with the identification information "ID0002". Note that, the above-described way to associate target information with identification information according to the semantic content indicated by the target information is merely an example. A rule of association of target information with identification information may change as appropriate for each piece of electronic book content d20.

Electronic book content d20 is associated with replacement control information d60 (see FIG. 4) indicating, on an identification-information basis, conditions for replacing pieces of target information respectively associated with pieces of identification information. Since the replacement control information d60 has been already explained, repeated explanation is omitted here.

(User-Information Acquisition Processing)

Next, out of the configuration of the information processing device 10, a configuration relating to processing to acquire information about a user as a reader will be described.

The content acquisition unit 102 accesses the content distribution server 50 via the network n1 and acquires the electronic book content d20 from the content distribution server 50. The content acquisition unit 102 stores the acquired electronic book content d20 in the content storage unit 104. The content storage unit 104 is a storage unit for storing the electronic book content d20.

At this time, if the application d10 for reading the electronic book content d20 has not been installed in the information processing device 10, the content acquisition unit 102 may acquire the application d10 from the content distribution server 50. When the content acquisition unit 102 has acquired the application d10, a processing unit (not shown) of the information processing device 10 may be caused to operate so as to install the acquired application d10 in the information processing device 10, for example.

The content analyzing unit 106 reads the electronic book content d20 from the content storage unit 104. By analyzing the read electronic book content d20, the content analyzing unit 106 converts the electronic book content d20 to data that enables the target information included in the electronic book content d20 to be read and edited. As a specific example, by structuring various data inside the electronic book content d20, the content analyzing unit 106 may convert to data that enables the target information included in the electronic book content d20, to be read and edited.

The content analyzing unit 106 outputs the electronic book content d24 after analysis to the data editing unit 112. Note that the electronic book content d20 may be provided from the content distribution server 50 as data that has already been analyzed. It should be obvious that if the electronic book content d20 is provided as analyzed data, the content analyzing unit 106 does not have to be provided. In this case, the data editing unit 112, described later, may read the electronic book content d20 from the content storage unit 104. Also, in the following description, even when the simple expression "electronic book content d20" is used, it is assumed that the electronic book content d20 to be processed by the data editing unit 112 is the electronic book content d20 after analysis.

The data editing unit 112 acquires the electronic book content d20 from the content analyzing unit 106. The data editing unit 112 extracts the replacement control information d60 from the acquired electronic book content d20, and outputs the extracted replacement control information d60 to the replacement-information management unit 110. By using the replacement control information d60, the replacement-information management unit 110 can recognize, for each piece of target information in the electronic book content d20, a condition for acquiring other information necessary for replacing the target information. Note that, the other information necessary for replacing the target information may be referred to as "replacement information" hereinafter. The replacement information corresponds to an example of the "second information". Details of the replacement-information management unit 110 will be described later.

The data editing unit 112 may associate the replacement control information d60 with information for identifying the electronic book content d20 that is an extraction source, and may output the replacement control information d60 associated with the identification information to the replacement-information management unit 110. On the basis of such configuration, the later-described replacement-information management unit 110 can manage the replacement control information d60 for each piece of electronic book content d20 that is the extraction source. As another example, while the replacement control information d60 is associated with the electronic book content d20, the replacement control information d60 is also associated with information for identifying the electronic book content d20.

The replacement-information management unit 110 acquires the replacement control information d60 from the data editing unit 112. The replacement management unit 110 extracts pieces of identification information d612 and types d616 associated with the respective pieces of the identification information d612 from the replacement control information d60. The replacement-information management unit 110 outputs the extracted pieces of identification information d616 and types d616 associated with the respective pieces of the identification information d612 to the user-information acquisition unit 108. Subsequently, the replacement-information management unit 110 causes the user-information acquisition unit 108 to acquire, for each of the pieces of identification information d612, information consistent with a condition indicated in each of the types d616. Detailed operation performed by the user-information acquisition unit 108 will be described later.

In response to the pieces of identification information d612 and the types d616, the replacement-information management unit 110 acquires, from the user-information acquisition unit 108, information consistent with the condition indicated in each of the types d616 for each of the pieces of identification information d612. The information acquired from the user-information acquisition unit 108 for each of the pieces of identification information d612 corresponds to replacement information.

The user-information acquisition unit 108 may not acquire pieces of replacement information consistent with respective conditions indicated in the types d616, for all pieces of identification information d612 included in the replacement control information d60. In a case where the user-information acquisition unit 108 failed to acquire replacement information consistent with a condition indicated in a type d616, the replacement-information management unit 110 receives a notification and corresponding identification information d612, the notification indicating that acquisition of information from the user-information acquisition unit 108 was failed. According to such configuration, the replacement-information management unit 110 can recognize which replacement information corresponding to identification information d612 was failed to be acquired.

For each piece of identification information d612, the replacement-information management unit 110 associates the identification information d612, the default value d614, and the type d616 included in the replacement control information d60 with the replacement information acquired on the basis of the type d616, and generates the replacement-information management table d80. For example, FIG. 6 is a diagram showing an example of the replacement-information management table.

As shown in FIG. 6, the replacement-information management table d80 includes pieces of identification information d812, default values d814, types d816, and pieces of replacement information d818. The pieces of identification information d812, the default values d814, and the types 816 correspond to the pieces of identification information d612, the default values d614, and the types 616 in the replacement control information d60, respectively. Each of the pieces of replacement information d818 represents, for each of the pieces of the identification information d612, replacement information acquired by the user-information acquisition unit 108 on the basis of a type d616 associated with the identification information d612.

In the example shown in FIG. 6, the replacement-information management unit 110 causes the user-information acquisition unit 108 to acquire information indicating "Name of User" indicated in the type d816 as the replacement information d818 corresponding to the identification information d812 represented by "ID0001". In response to this operation, the replacement-information management unit 110 acquires textual information "Jiro" corresponding to the "Name of User" from the user-information acquisition unit 108.

In a similar way, the replacement-information management unit 110 causes the user-information acquisition unit 108 to acquire information indicating "Friend who Often Communicates with User" indicated in a type d816 as replacement information d818 corresponding to the identification information d812 represented by "ID0002". In response to this operation, the replacement-information management unit 110 acquires textual information "Shinji" corresponding to the "Friend who Often Communicates with User" from the user-information acquisition unit 108.

As described above, the user-information acquisition unit 108 may not acquire pieces of replacement information consistent with respective conditions indicated in the types d616, for all pieces of identification information d612 included in the replacement control information d60. The example where the identification information d812 corresponding to "ID003" indicates a case where the user-information acquisition unit 108 failed to acquire information about "Library Near House of User" indicated by the type d812. As a specific example, the user-information acquisition unit 108 may not acquire information about the "Library Near House of User" in a case where the user does not register his/her home address in the SNS. In this case, the replacement-information management unit 110 receives a notification indicating that corresponding replacement information was failed to be acquired from the user-information acquisition unit 108. After receiving the notification indicating that the replacement information was failed to be acquired, the replacement-information management unit 110 registers, as replacement information d818, information (for example, "-" in FIG. 3) for identifying that the replace information was failed to be acquired.

The replacement-information management table d80 formed in the above-described way indicates, for each piece of the identification information d812, association between the target information indicated in the default value d814, the replacement information d818, and the type d816 indicating an acquisition condition of the replacement information d818.

The replacement-information management unit 110 may perform management by generating a replacement-information management table d80 for each piece of electronic book content d20. In this case, it is preferable for the replacement-information management unit 110 to acquire, from the data editing unit 112, identification information together with the replacement control information d60, the identification information identifying electronic book content d20 associated with the replacement control information d60. It is also preferable for the replacement—information management unit 110 to perform management by associating the generated replacement-information management table d80 with the identification information acquired together with the replacement control information d60 that can be a source of generation of the replacement-information management table d80.

The replacement-information management unit 110 may hold the generated replacement-information management table d80 in a non-volatile manner by storing such table in a storage apparatus. Since the replacement-information management table d80 becomes non-volatile, the replacement-information management unit 110 does not have to regenerate the replacement-information management table d80 in a case of acquiring the replacement control information d60 again from the data editing unit 112.

Next, operation performed by the user-information acquisition unit 108 is explained. The user-information acquisition unit 108 acquires, from the replacement information management unit 110, pieces of identification information d612 in the replacement control information d60 and types d616 associated with the respective pieces of the identification information d612. The user-information acquisition unit 108 checks contents in the acquired types d616 and determines whether or not access to the SNS is necessary for acquiring pieces of replacement information consistent with conditions indicated in the types d616.

In a case where the access to the SNS is necessary, the user-information acquisition unit 108 may display an input interface on the display unit 15 via the display control unit 152, the input interface designating information indicating the SNS that becomes an acquisition source of information about the user or authentication information for logging in to the SNS. In this case, the user-information acquisition unit 108 acquires, from the operation unit 13, the information indicating the SNS and the authentication information for logging in to the SNS that are input by the user. Hereinafter, both the information indicating the SNS which becomes the acquisition source of the information about the user and the authentication information for logging in to the SNS may be merely referred to as "access information to the SNS".

Note that the user-information acquisition unit 108 may hold the acquired access information to the SNS in a nonvolatile manner by storing such information in a storage apparatus. In such case, when accessing the SNS again, the user-information acquisition unit 108 is capable of acquiring the access information for accessing such SNS from the storage apparatus.

On the basis of the acquired access information to the SNS, the user-information acquisition unit 108 establishes a connection with the SNS (that is, the external server 70), and acquires information consistent with the conditions indicated in the respective types d616 from the SNS.

As a specific example, the user-information acquisition unit 108 acquires, from the replacement-information management unit 110, the identification information d612 indicated by "ID001" and the type d616 indicating "Name of User" associated with the identification information d612 in the replacement control information d60 shown in FIG. 4. In this case, for example, the user-information acquisition unit 108 accesses the SNS designated by the user, and acquires "Name of User" registered in the profile in the SNS as replacement information corresponding to the identification information d612 indicated by "ID001".

As another example, the user-information acquisition unit 108 acquires, from the replacement-information management unit 110, the identification information d612 indicated by "ID0002" and the type d616 indicating "Friend Who Often Communicates with User" associated with the identification information d612. In this case, the user-information acquisition unit 108 accesses the SNS designated by the user, and searches the social graph in the SNS, for example. Next, as replacement information corresponding to the identification information d612 indicated by "IS002", the user-information acquisition unit 108 may acquire a name of another user (for example, another user having a huge amount of traffic and comments on massages from the user) who often communicates with the user from among other users associated with the user in the social graph in the SNS.

The information acquired by the user-information acquisition unit 108 is not limited to textual information. For example, the acquired information may be image information such as a photograph. For example, the user-information acquisition unit 108 may search images registered in the SNS by the user, and acquire, as replacement information, an image consistent with a condition of a place and time indicated in the type d616. According to such configuration, the user-information acquisition unit 108 is capable of acquiring, as replacement information, an image having latest registration date from among the images registered in the SNS by the user by setting "Image of Place where User Visits Recently" as a condition in the type d616.

In addition, the user-information acquisition unit 108 may recognize a position of the information processing device 10 as a position of the user, and acquires information indicating the position of the user or other information about the position of the user as the replacement information.

For example, by installing the position-information acquisition unit 120, the user-information acquisition unit 108 can acquire the position of the information processing device 10 from the position-information acquisition unit 120. The position-information acquisition unit 120 may include a global positioning system (GPS) receiver and the like, for example.

An example of a case of acquiring replacement information based on position information is described as follows. For example, the user-information acquisition unit 108 acquires, from the replacement-information management unit 110, the identification information d612 represented by "ID005" and the type d616 indicating "Current Place of User" associated with the identification information d612 in the replacement control information d60 of the user shown in FIG. 4. In this case, the user-information acquisition unit 108 acquires position information (for example, coordinates) of the information processing device 10 from the position-information acquisition unit 120, for example. The user-information acquisition unit 108 may acquire, as replacement information corresponding to the identification information d612 represented by "ID005", a place name indicated by the acquired position information on the basis of searching through a network like the Internet, for example. In addition, the user-information acquisition unit 108 may search the social graph in the SNS, and acquire, as the replacement information, the place name indicated by the acquired position information.

Needless to say, as long as the user-information acquisition unit 108 can specify a place name indicated by the acquired position information, the way of specifying is not limited. For example, the user-information acquisition unit 108 may specify the place name indicated by the acquired position information by checking the acquired position information against other information (for example, map information) stored in the information processing device 10.

In addition, on the basis of the position information acquired from the position-information acquisition unit 120, the user-information acquisition unit 108 may search the social graph in the SNS, and may acquire other information relating to the acquired position information. As a specific example, on the basis of position information acquired from the position-information acquisition unit 120, the user-information acquisition unit 108 may acquire a photograph taken in the past at a position indicated by the position information, from among photographs registered by the user in the SNS. As another example, the user-information acquisition unit 108 may acquire, from among other users relating to the user in the SNS, a name of one of the other user who posted a comment about the position information acquired from the position-information acquisition unit 120. Needless to say, it is necessary to previously set operations corresponding to the types d616 when causing the user-information acquisition unit 108 to be operated in the above-described way.

In the above, the user-information acquisition unit 108 acquires pieces of information consistent with respective conditions indicated by the types d616 from a network service such as the SNS. However, an acquisition source of other information is not limited as long as at least some information is acquired from the SNS. For example, the user-information acquisition unit 108 may acquire other information from information stored in the information processing device 10.

In the above-described way, the user-information acquisition unit 108 acquires pieces of replacement information consistent with respective conditions indicated by the types d616 associated with respective pieces of identification information d612, and notifies the replacement-information management unit 110 of the acquired pieces of replacement information for each of the pieces of corresponding identification information d612. In the case where the replacement information was failed to be acquired, the user-information acquisition unit 108 notifies the replacement-information management unit 110 of failure in acquisition of the replacement information together with the identification information d612 associated with the type d616 which is involved in acquisition of the replacement information. According to the above-described configuration, the replacement-information acquisition unit 110 can acquire pieces of replacement information corresponding to respective pieces of identification information d612 from the user-information acquisition unit 108, and can generate the replacement-information management table d80 based on the acquired pieces of replacement information.

(Information Replacement Processing)

Next, out of the configuration of the information processing device 10, there will be described a configuration relating to processing to replace some information in the electronic book content d20 with pieces of information about the user.

After generating the replacement-information management table d80, the replacement-information management unit 110 notifies the data editing unit 112 of the replacement information associated with the identification information d812 for each piece of the identification information d812 in the generated replacement-information management table d80. In the case where identification information d812 is not associated with replacement information d818, the replacement-information management unit 110 notifies the data editing unit 112 of a default value d814 instead of the replacement information d818. As described above, the replacement-information management unit 110 notifies the data editing unit 112 of at least any one of the replacement information d818 and the default value d814 for each piece of identification information d812.

In response to the replacement control information d60, the data editing unit 112 acquires the replacement information d818 or the default value d814 from the replacement-information management unit 110 for each piece of the identification information d612 (that is, the identification information d812 in the replacement-information management table d80) indicated in the replacement control information d60.

Specifically, the data editing unit 112 acquires the replacement information d818 from the replacement-information management unit 110, with regard to the identification information d612 for which the replacement-information management unit 110 has acquired the replacement information d818. On the other hand, with regard to identification information d612 for which the replacement-information management unit 110 has not acquired replacement information d818, the data editing unit 112 acquires, from the replacement-information management unit 110, the identification information d612 (that is, a default value d814 associated with the identification information d812). Hereinafter, both the replacement information d818 and the default value d814 may be merely referred to as "replacement information" in the case where the replacement information d818 and the default value d814 are not especially distinguished.

The data editing unit 112 replaces the target information associated with the identification information d612 in the electronic book content d20 with replacement information acquired for each piece of the identification information d612. According to the above-described configuration, out of pieces of target information in the electronic book content d20, some pieces of target information associated with respective pieces of identification information d612 for which respective pieces of replacement information d818 have been acquired are replaced with the respective pieces of replacement information d818. In the case of target information associated with identification information for which replacement information d818 has not been acquired, substantial replacement is not performed since the target information is replaced with a default value d814 (that is, the target information).

Note that, the data editing unit 112 may be operated in a manner that the replacement processing is not executed (that is, omitted) for the target information associated with the identification information d612 for which the replacement information d818 has not been acquired. In this case where the identification information d812 is not associated with the replacement information d818 in the replacement-information management table d80, the replacement-information management unit 110 may notify the data editing unit 112 of the identification information d812 and information indicating that the replacement information d818 has not been acquired. According to the notification, the data editing unit 112 can recognize that the replacement information d818 has not been acquired for the corresponding identification information d612 (that is, the notified identification information d812). That is, in the case of receiving such notification, it is preferable for the data editing unit 112 not to perform the replacement processing on the target information associated with the corresponding identification information d612 (that is, the notified identification information d812) so as to skip to next processing.

The data editing unit 112 outputs, to the display control unit 152, electronic book content d20 in which pieces of target information has been replaced with respective pieces of replacement information. The display control unit 152 acquires the electronic book content d20 in which the pieces of target information has been replaced with the respective pieces of replacement information from the data editing unit 112, and displays the acquired electronic book content d20 on the display unit 15. Accordingly, the user can read the electronic book content d20 on which information about the user himself/herself and information about other users relating to the user himself/herself are reflected.

It is also possible that an externally-installed server performs at least a piece of processing out of pieces of processing performed by the respective unit of the information processing device 10. As a specific example, the analysis of the electronic book content d20, the acquisition of the replacement information, the processing for replacing the target information in the electronic book content d20 with the acquired replacement information, that are performed by the information processing 10, may be performed in the externally-installed server. In this case, the content acquisition unit 102, the content storage unit 104, the content analyzing unit 106, the user-information acquisition unit 108, the replacement-information management unit 110, and the data editing unit 112 may be installed in the externally-installed server, for example.

As another configuration example, the content acquisition unit 102, the content storage unit 104, and the content analyzing unit 106 may be installed in the externally-installed server so that pieces of processing up to analyzing the electronic book content d20 are performed in the externally-installed server.

As the externally-installed server, the content distribution server 50 or the external server which provides the SNS may be used. On the other hand, it is also possible to install another server to edit the electronic book content d20.

3. Processing

Figure 7:
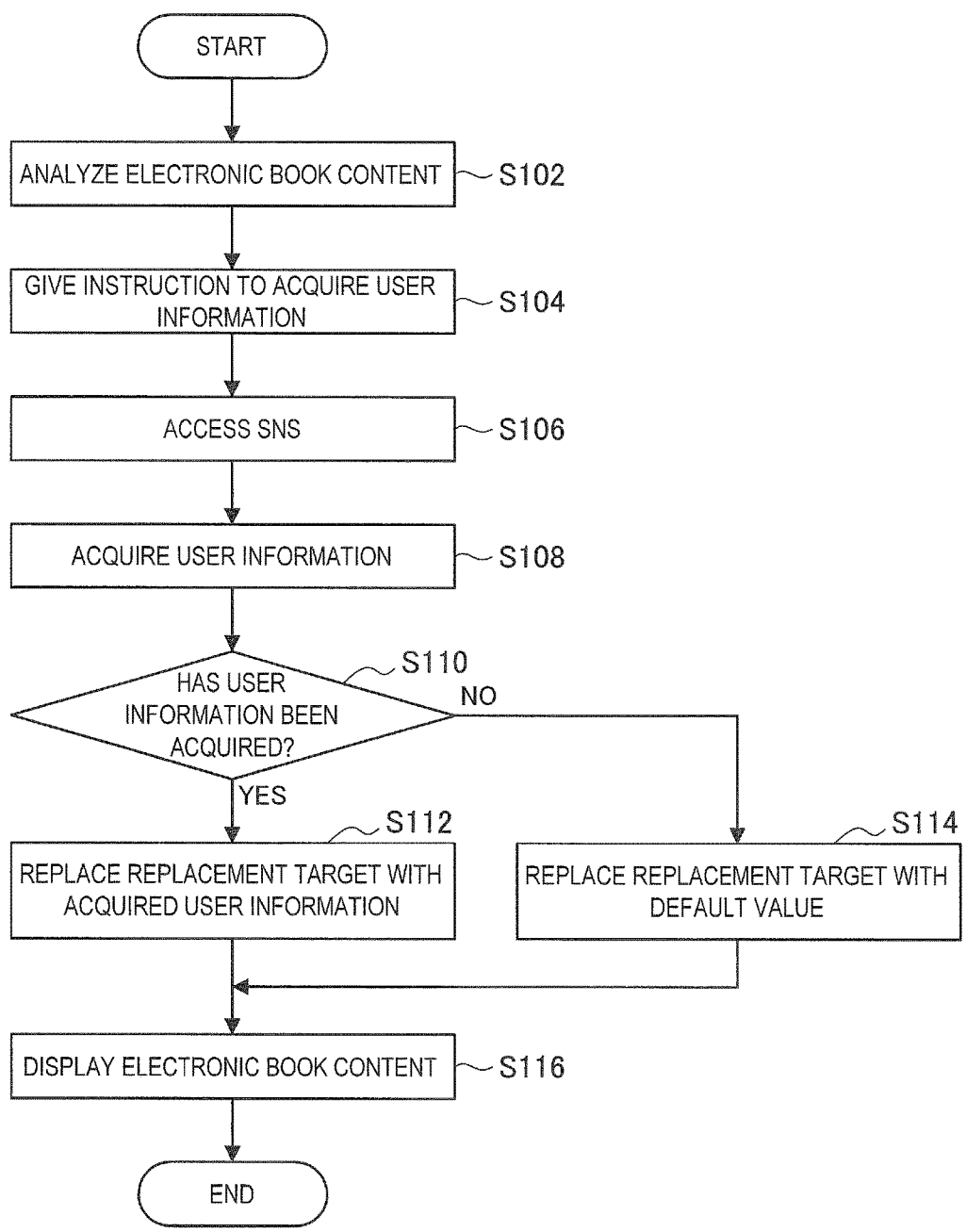
FIG. 7 is a flowchart showing a flow of a series of processing performed by the information processing device according to the embodiment.

Next, with reference to FIG. 7, a flow of a series of processing by the information processing device 10 according to the present embodiment will be described. FIG. 7 is a flowchart showing the flow of the series of processing performed by the information processing device 10 according to the present embodiment. Hereinafter, an explanation is described under a premise that the electronic book content d20 to be displayed has already been acquired from the content distribution server 50 and stored in the content storage unit 104.

(Step S102)

The content analyzing unit 106 reads the electronic book content d20 from the content storage unit 104. By analyzing the read electronic book content d20, the content analyzing unit 106 converts the electronic book content d20 to data that enables pieces of target information included in the electronic book content d20, to be read and edited. As a specific example, by structuring various data inside the electronic book content d20, the content analyzing unit 106 may convert to data that enables the pieces of target information included in the electronic book content d20, to be read and edited.

The content analyzing unit 106 outputs the electronic book content d20 after analysis to the data editing unit 112.

(Step S104)

The data editing unit 112 acquires the electronic book content d20 from the content analyzing unit 106. The data editing unit 112 extracts the replacement control information d60 from the acquired electronic book content d20, and outputs the extracted replacement control information d60 to the replacement-information management unit 110.

The replacement-information management unit 110 acquires the replacement control information d60 from the data editing unit 112. The replacement-information management unit 110 extracts pieces of identification information and the types d612 associated with the respective pieces of identification information d612 from the replacement control information d60. The replacement-information management unit 110 outputs, to the user-information acquisition unit 108, the extracted pieces of identification information d612 and the extracted types d616 associated with the respective pieces of identification information d612. Subsequently, the replace-information management unit 110 causes the user-information acquisition unit 108 to acquire, for each of the pieces of identification information, information consistent with a condition indicated by each of the types d616.

(Step S106)

The user-information acquisition unit 108 acquires, from the replacement-information management unit 110, the pieces of identification information d612 in the replacement control information d60 and the types d616 associated with the respective pieces of identification information d612. The user-information acquisition unit 108 checks contents of the acquired types d616, and determines whether or not access to the SNS is necessary for acquiring replacement information consistent with the condition indicated in each of the types d616.

In a case where the access to the SNS is necessary, the user-information acquisition unit 108 may display an input interface on the display unit 15 via the display control unit 152, the input interface designating information indicating the SNS that becomes an acquisition source of information about the user or authentication information for logging in to the SNS. In this case, the user-information acquisition unit 108 acquires, from the operation unit 13, the information indicating the SNS and the authentication information for logging in to the SNS that are input by the user. Hereinafter, both the information indicating the SNS which becomes the acquisition source of the information about the user and the authentication information for logging in to the SNS may be merely referred to as "access information to the SNS".

(Step S108)

On the basis of the acquired access information to the SNS, the user-information acquisition unit 108 establishes a connection with the SNS, and acquires information consistent with the conditions indicated in the respective types d616 from the SNS.

As a specific example, the user-information acquisition unit 108 acquires, from the replacement-information management unit 110, the identification information d612 indicated by "ID001" and the type d616 indicating "Name of User" associated with the identification information d612 in the replacement control information d60 shown in FIG. 4. In this case, for example, the user-information acquisition unit 108 accesses the SNS designated by the user, and acquires "Name of User" registered in the profile in the SNS as replacement information corresponding to the identification information d612 indicated by "ID001".

As another example, the user-information acquisition unit 108 acquires, from the replacement-information management unit 110, the identification information d612 indicated by "ID0002" and the type d616 indicating "Friend Who Often Communicates with User" associated with the identification information d612. In this case, the user-information acquisition unit 108 accesses the SNS designated by the user, and searches the social graph in the SNS, for example. Next, as replacement information corresponding to the identification information d612 indicated by "IS002", the user-information acquisition unit 108 may acquire a name of another user (for example, another user having a huge amount of traffic and comments on massages from the user) who often communicates with the user from among other users associated with the user in the social graph in the SNS.

The information acquired by the user-information acquisition unit 108 is not limited to textual information. For example, the acquired information may be image information such as a photograph. For example, the user-information acquisition unit 108 may search images registered in the SNS by the user, and acquire, as replacement information, an image consistent with a condition of a place and time indicated in the type d616. According to such configuration, the user-information acquisition unit 108 is capable of acquiring, as replacement information, an image having a latest registration date from among the images registered in the SNS by the user by setting "Image of Place where User Visits Recently" as a condition in the type d616.

In the above-described way, the user-information acquisition unit 108 acquires pieces of replacement information consistent with respective conditions indicated by the types d616 associated with respective pieces of identification information d612, and notifies the replacement-information management unit 110 of the acquired pieces of replacement information for each of the pieces of corresponding identification information d612. In the case where the replacement information was failed to be acquired, the user-information acquisition unit 108 notifies the replacement-information management unit 110 of failure in acquisition of the replacement information together with the identification information d612 associated with the type d616 which is involved in acquisition of the replacement information.

For each piece of identification information d612, the replacement-information management unit 110 associates the identification information d612, the default value d614, and the type d616 included in the replacement control information d60 with the replacement information acquired on the basis of the type d616, and generates the replacement-information management table d80.

As described above, note that the user-information acquisition unit 108 may not acquire pieces of replacement information consistent with respective conditions indicated in the types d616, for all pieces of identification information d612 included in the replacement control information d60. In this case, the replacement-information management unit 110 receives a notification indicating that corresponding replacement information was failed to be acquired from the user-information acquisition unit 108. After receiving the notification indicating that the replacement information was failed to be acquired, the replacement-information management unit 110 registers, as replacement information d818, information (for example, "-" in FIG. 3) for identifying that the replace information was failed to be acquired.

(Step S110)
After generating the replacement-information management table d80, the replacement-information management unit 110 notifies the data editing unit 112 of the replacement information associated with the identification information d812 for each piece of the identification information d812 in the generated replacement-information management table d80. In the case where identification information d812 is not associated with replacement information d818, the replacement-information management unit 110 notifies the data editing unit 112 of a default value d814 instead of the replacement information d818. As described above, the replacement-information management unit 110 notifies the data editing unit 112 of at least any one of the replacement information d818 and the default value d814 for each piece of identification information d812.

(Step S112)
The data editing unit 112 acquires the replacement information d818 from the replacement-information management unit 110, with regard to the identification information d612 for which the replacement-information management unit 110 has acquired the replacement information d818 (YES in step S110).

The data editing unit 112 replaces the target information associated with the identification information d612 in the electronic book content d20 with replacement information acquired for each piece of the identification information d612. According to the above-described configuration, out of pieces of target information in the electronic book content d20, some pieces of target information associated with respective pieces of identification information d612 for which respective pieces of replacement information d818 have been acquired are replaced with the respective pieces of replacement information d818.

(Step S114)
On the other hand, with regard to identification information d612 for which the replacement-information management unit 110 has not acquired replacement information d818 (NO in step S110), the data editing unit 112 acquires, from the replacement-information management unit 110, the identification information d612 (that is, a default value d814 associated with the identification information d812).

In this case, the data editing unit 112 replaces the target information associated with identification information d612 in the electronic book content d20 with the default value d814 acquired for the identification information d612. In this case, with regard to the target information associated with identification information for which the replacement information d818 has not been acquired, substantial replacement is not performed since the target information is replaced with a default value d814 (that is, the target information).

Note that, the data editing unit 112 may be operated in a manner that the replacement processing is not executed (that is, omitted) for the target information associated with the identification information d612 for which the replacement information d818 has not been acquired. In this case where the identification information d812 is not associated with the replacement information d818 in the replacement-information management table d80, the replacement-information management unit 110 may notify the data editing unit 112 of the identification information d812 and information indicating that the replacement information d818 has not been acquired. According to the notification, the data editing unit 112 can recognize that the replacement information d818 has not been acquired for the corresponding identification information d612 (that is, the notified identification information d812). That is, in the case of receiving such notification, it is preferable for the data editing unit 112 not to perform the replacement processing on the target information associated with the corresponding identification information d612 (that is, the notified identification information d812) so as to skip to next processing.

(Step S116)

The data editing unit 112 outputs, to the display control unit 152, electronic book content d20 in which pieces of target information has been replaced with respective pieces of replacement information. The display control unit 152 acquires the electronic book content d20 in which the pieces of target information has been replaced with the respective pieces of replacement information from the data editing unit 112, and displays the acquired electronic book content d20 on the display unit 15. Accordingly, the user can read the electronic book content d20 on which information about the user himself/herself and information about other users relating to the user himself/herself are reflected.

4. Hardware Configuration Example

Figure 8:
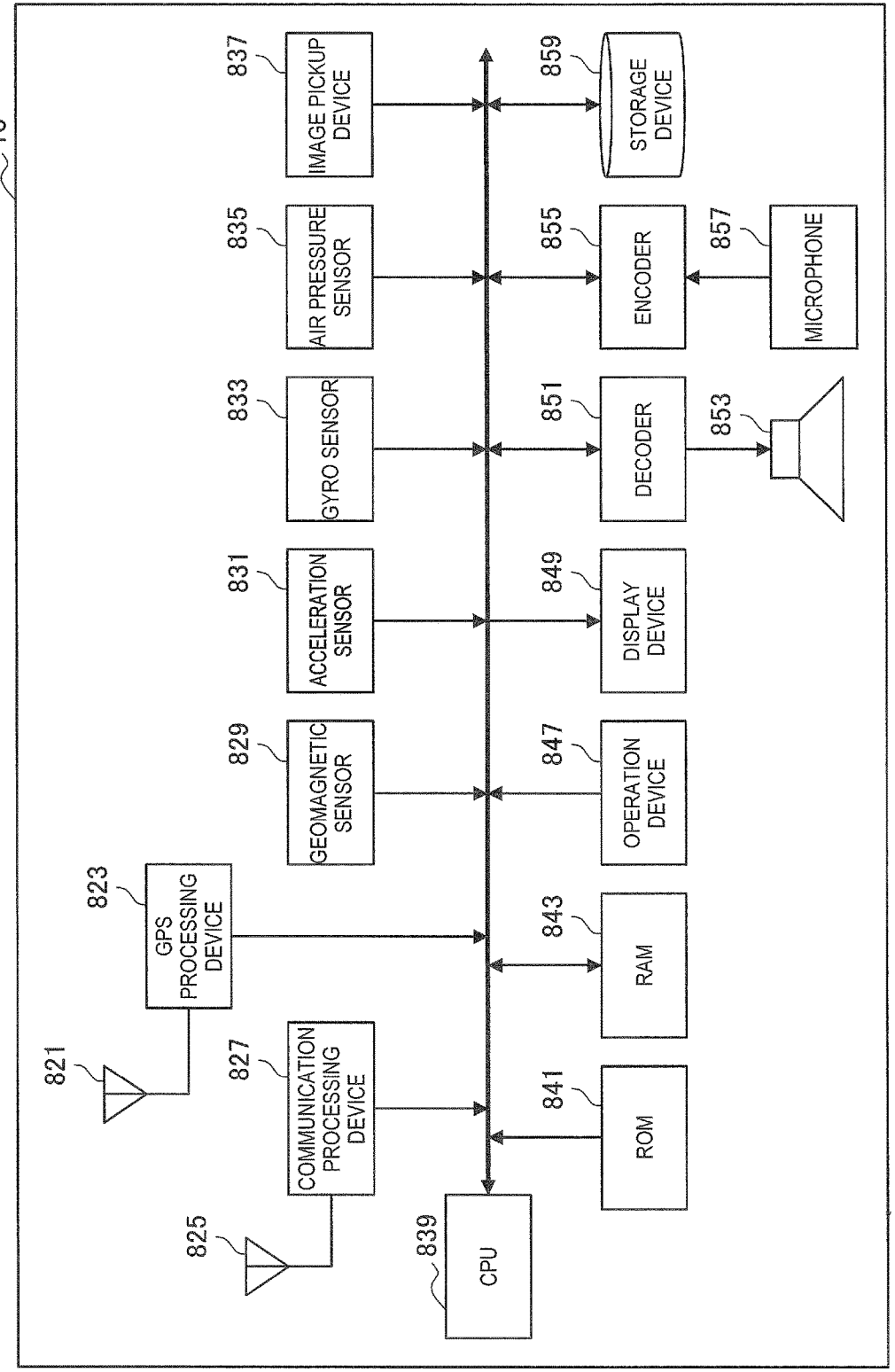
FIG. 8 is an example of a hardware configuration of an information processing device according to an embodiment of the disclosure.

The information processing by the information processing device 10 according to the above-described embodiment of the present disclosure is achieved by cooperative operation of hardware of the information processing device 10, such as that described below, and software. With reference to FIG. 8, an example of the hardware configuration of the information processing device 10 is described below. FIG. 8 is a block diagram showing the example hardware configuration of the information processing device 10.

For example, the information processing device 10 includes a GPS antenna 821, a GPS processing device 823, a communication antenna 825, a communication processing device 827, a geomagnetic sensor 829, an acceleration sensor 831, a gyro sensor 833, an air pressure sensor 835, an image pickup device 837, a central processing unit (CPU) 839, read only memory (ROM) 841, a random access memory (RAM) 843, an operation device 847, a display device 849, a decoder 851, a speaker 853, an encoder 855, a microphone 857, and a storage device 859.

The GPS antenna 821 is an example of an antenna that receives signals from positioning satellites. The GPS antenna 821 is capable of receiving GPS signals from a plurality of GPS satellites and inputting the received GPS signals into the GPS processing device 823.

The GPS processing device 823 is an example of a calculation unit that calculates position information based on the signals received from positioning satellites. The GPS processing device 823 calculates present position information based on the plurality of GPS signals inputted from the GPS antenna 821 and outputs the calculated position information. More specifically, the GPS processing device 823 calculates the positions of the respective GPS satellites from orbital data of the GPS satellites and calculates the distance from each GPS satellite to the information processing device based on the time difference between the transmission time and reception time of GPS signals. It is also possible to calculate a current three-dimensional position based on the calculated positions of the respective GPS satellites and the distances from the respective GPS satellites to the information processing device. Note that the orbital data of the GPS satellites used here may be included in the GPS signals, for example. Alternatively, the orbital data of the GPS satellites may be acquired from an external server via the communication antenna 825. Note that, it is preferable that the position-information acquisition unit 120 includes the GPS processing device 823 and the GPS antenna 821.

The communication antenna 825 is an antenna with a function for receiving a communication signal via a mobile communication network or a wireless local area network (LAN) communication network, for example. The communication antenna 825 is capable of supplying a received signal to the communication processing device 827.

The communication processing device 827 includes a function of carrying out various types of signal processing on a signal supplied from the communication antenna 825. The communication processing device 827 is capable of supplying a digital signal generated from the supplied analog signal to the CPU 839.

The geomagnetic sensor 829 is a sensor that detects geomagnetism as a voltage value. The geomagnetic sensor 829 may be a triaxial geomagnetic sensor that detects geomagnetism in an X axis direction, a Y axis direction, and Z axis direction, respectively. The geomagnetic sensor 829 is capable of supplying the detected geomagnetic sensor data to the CPU 839.

The acceleration sensor 831 is a sensor that detects acceleration as a voltage value. The acceleration sensor 831 may be a triaxial acceleration sensor that detects acceleration along the X axis direction, acceleration along the Y axis direction, and acceleration along the Z axis direction, respectively. The acceleration sensor 831 is capable of supplying the detected acceleration data to the CPU 839.

The gyro sensor 833 is a type of measuring instrument that measures the angle and/or angular velocity of an object. The gyro sensor 833 may be a triaxial gyro sensor that detects a velocity (angular velocity) that changes a rotational angle around the X axis, the Y axis, and the Z axis as a voltage value. The gyro sensor 833 is capable of supplying the detected angular velocity data to the CPU 839.

The air pressure sensor 835 is a sensor that detects ambient air pressure as a voltage value. The air pressure sensor 835 is capable of detecting air pressure with a specified sampling frequency and supplying the detected air pressure data to the CPU 839.

The image pickup device 837 has a function of picking up still images or moving images via a lens in accordance with control performed by the CPU 839. The image pickup device 837 may store the picked-up images in the storage device 859.

The CPU 839 functions as a computational processing apparatus and a control apparatus, and controls the entire operations inside the information processing device 10 in accordance with various programs. The CPU 839 may be a microprocessor. Such CPU 839 is capable of achieving various functions in accordance with the various programs. Note that the operations of the content acquisition unit 102, the content analyzing unit 106, the user-information acquisition unit 108, the replacement-information management unit 110, the data editing unit 112, and the display control unit 151 are achieved by the CPU 839 executing a program in which the operations of such various configurations are defined.

The ROM 841 is capable of storing a program, computation parameters, and the like used by the CPU 839. The RAM 843 is capable of temporarily storing a program to be used in execution of the CPU 839 and parameters and the like that change as appropriate during such execution.

The operation device 847 has a function of generating an input signal for carrying out an operation desired by the user. The operation device 847 may be constructed of an input unit, such as a touch sensor, mouse, keyboard, button or button(s), microphone, switch or switches, or lever or levers, for enabling the user to input information, an input control circuit that generates an input signal based on an input made by the user and outputs to the CPU 839, for example.

The display device 849 is an example of an output apparatus and may be a display apparatus such as a liquid crystal display (LCD) apparatus or an organic EL (OLED: organic light emitting diode) display apparatus. The display device 849 is capable of providing information by displaying a screen to the user.

The decoder 851 has a function of carrying out decoding, analog conversion, and the like on inputted data in accordance with control performed by the CPU 839. For example, the decoder 851 carries out decoding, analog conversion, and the like of audio data that has been inputted via the communication antenna 825 and the communication processing device 827 and outputs an audio signal to the speaker 853. The speaker 853 is capable of outputting audio based on the audio signal supplied from the decoder 851.

The encoder 855 has a function of carrying out digital conversion, encoding, and the like on inputted data in accordance with control performed by the CPU 839. The encoder 855 is capable of carrying out digital conversion, encoding, and the like of an audio signal inputted from the microphone 857 and outputting audio data. The microphone 857 is capable of picking up audio and outputting as an audio signal.

The storage device 859 is an apparatus for storing data and can include a storage medium, a recording apparatus that records data onto a storage medium, a reading apparatus that reads data from a storage medium, a deleting device that deletes data recorded on a storage medium, and the like. As the storage medium, it is possible to use a nonvolatile memory such as flash memory, magnetoresistive random access memory (MRAM), ferroelectric random access memory (FeRAM), phase change random access memory (PRAM) and electronically erasable and programmable read only memory (EEPROM) or a magnetic recording medium such as a hard disk drive (HDD).

For example, the display unit described above may be a head mounted display (HMD). For example, if a non-transmissive HMD is used as the display unit, it is not necessary to display picked-up images on the display unit. In such case, the display unit may superimpose virtual objects on a real space instead of displaying picked-up images.

It is also possible to produce a program for causing hardware such as the CPU, ROM, and RAM incorporated in a computer to achieve same functions as the configuration of the information processing device described above. It is also possible to provide a computer-readable recording medium on which such a program has been recorded.

5. Conclusion

As described above, the information processing device 10 according to the present embodiment can replace at least some information in the electronic book content d20 with pieces of information which the user as a reader forms by using the SNS. Accordingly, the user can enjoy the electronic book content d20 as a work having more sense of affinity and reality.

In addition, the information processing device 10 according to the present embodiment acquires information about the user as the reader from the SNS. Accordingly, the information processing device 10 can acquire not only information about the user himself/herself but also other information (for example, information about other users) associated with the user from the social graph, and it is possible to reflect the acquired information on the electronic book content d20. That is, the information processing device 10 according to the present embodiment can reflect, on the electronic book content d20, not only information about the user as the reader, but also information based on a social network built between the user and other users in the SNS. Accordingly, the user can enjoy the electronic book content d20 as the work having more sense of affinity and reality than a case where information only about the user himself/herself is reflected on.

It should be understood by those skilled in the art that various modifications, combinations, sub-combinations and alterations may occur depending on design requirements and other factors insofar as they are within the scope of the appended claims or the equivalents thereof.

The effects described in the present specification are indicated merely for explanatory and illustrative purposes and the effects of the embodiment of the present disclosure are not limited to those given herein. That is, in addition to or in place of the effects given above, the technology according to the present disclosure may have other effects that are apparent to those of skill in the art from the disclosure of this specification.

Additionally, the present technology may also be configured as below:

(1) An information processing device including:
an information acquisition unit configured to, on the basis of a condition previously associated with at least a piece of identification information in book data in which the identification information is associated with at least a part of first information among pieces of information, acquire second information consistent with the condition from a social networking service; and
an editing unit configured to replace the first information associated with the piece of identification information with the acquired second information.

(2) The information processing device according to (1),
wherein the information acquisition unit acquires, as the second information, information associated with a user ID to identify a user in the social networking service.

(3) The information processing device according to (2),
wherein, in a case where the user ID is associated with another user ID in the social networking service, the information acquisition unit acquires, as the second information, information associated with the another user ID.

(4) The information processing device according to (2) or (3),
wherein the information acquisition unit acquires the second information on the basis of position information associated with the user ID in the social networking service.

(5) The information processing device according to (4),
wherein the information acquisition unit acquires the second information on the basis of position information of a place where the user visited in a past.

(6) The information processing device according to (4) or (5),
wherein the second information is image data, and
wherein the information acquisition unit acquires the image data associated with the position information.

(7) The information processing device according to any one of (2) to (6),
wherein the information acquisition unit acquires position information indicating a position of the user, and acquires the second information on the basis of the acquired position information.

(8) The information processing device according to any one of (1) to (7), further including:
a display control unit configured to cause a display unit to display the book data.

(9) An information processing method including:
  acquiring, on the basis of a condition previously associated with at least a piece of identification information in book data in which the identification information is associated with at least a part of first information among pieces of information, second information consistent with the condition from a social networking service; and
  replacing, by a processor, the first information associated with the piece of identification information with the acquired second information.

(10) A program for causing a computer to execute:
  acquiring, on the basis of a condition previously associated with at least a piece of identification information in book data in which the identification information is associated with at least a part of first information among pieces of information, second information consistent with the condition from a social networking service; and
  replacing the first information associated with the piece of identification information with the acquired second information.

What is claimed is:

1. An information processing device, comprising:
  a content acquisition unit configured to:
    acquire book data from a content server via a network, wherein the acquired book data comprises first information among a plurality of pieces of information, and the acquired book data is associated with replacement control information including at least a first type of the first information; and
    acquire an application from the content server via the network;
  a processing unit configured to install the acquired application on the information processing device;
  a display unit configured to display the acquired book data based on the installation of the acquired application;
  an information acquisition unit configured to acquire, via the network, second information based on a search of a social graph of a first user registered with a social networking service and based on a condition indicated in the first type, wherein the second information has a second type similar to the first type; and
  an editing unit configured to replace the first information in the displayed book data with the acquired second information.

2. The information processing device according to claim 1, wherein the information acquisition unit is further configured to acquire, as the second information, first user information associated with a first user ID to identify the first user in the social networking service.

3. The information processing device according to claim 2, wherein the information acquisition unit is further configured to acquire the second information based on position information associated with the first user ID in the social networking service.

4. The information processing device according to claim 3, wherein the information acquisition unit is further configured to acquire the second information based on the position information of a place of visit by the first user.

5. The information processing device according to claim 3,
  wherein the second information is image data, and
  wherein the information acquisition unit is further configured to acquire the image data associated with the position information.

6. The information processing device according to claim 2, wherein, based on the first user ID associated with a second user ID in the social networking service, the information acquisition unit is further configured to acquire, as the second information, second user information associated with the second user ID.

7. The information processing device according to claim 2, wherein the information acquisition unit is further configured to:
  acquire position information indicating a position of the first user, and
  acquire the second information based on the position information.

8. The information processing device according to claim 1, further comprising:
  a display control unit configured to control the display of the acquired book data based on the replacement by the editing unit.

9. The information processing device according to claim 1, wherein the information acquisition unit is further configured to determine at least the first type of the first information based on the replacement control information of the acquired book data.

10. The information processing device according to claim 1, wherein the editing unit is further configured to replace the first information in the acquired book data with default information, based on an inability to acquire the second information.

11. An information processing method, comprising:
  in an information processing device:
    acquiring book data from a content server via a network,
      wherein the acquired book data comprises first information among a plurality of pieces of information, and the acquired book data is associated with replacement control information including at least a first type of the first information;
    acquiring an application from the content server via the network;
    installing the acquired application on the information processing device;
    displaying the acquired book data based on the installation of the acquired application;
    acquiring, via the network, second information based on a search of a social graph of a first user registered with a social networking service and based on a condition indicated in the first type, wherein the second information has a second type similar to the first type; and
    replacing the first information in the displayed book data with the acquired second information.

12. A non-transitory computer-readable medium having stored thereon, computer-executable instructions, which when executed by a processor of an information processing device, cause the information processing device to execute operations, the operations comprising:
  acquiring book data from a content server, via a network,
    wherein the acquired book data comprises first information among a plurality of pieces of information, and the acquired book data is associated with replacement control information including at least a first type of the first information;
  acquiring an application from the content server via the network;
  installing the acquired application on the information processing device,
  displaying the acquired book data based on the installation of the acquired application;
  acquiring, via the network, second information based on a search of a social graph of a first user registered with a social networking service and based on a condition indicated in the first type, wherein the second information has a second type similar to the first type; and
replacing the first information in the displayed book data with the acquired second information.

* * * * *